United States Patent [19]

Dreier

[11] 4,428,831
[45] Jan. 31, 1984

[54] DISCHARGE ARRANGEMENT FOR REMOVING GREEN PELLETS OUT OF A PELLETIZING ARRANGEMENT

[75] Inventor: Rainer Dreier, Weyer, Austria

[73] Assignee: Voest-Alpine Aktiengesellschaft, Linz, Austria

[21] Appl. No.: 325,568

[22] Filed: Nov. 27, 1981

[30] Foreign Application Priority Data

Dec. 15, 1980 [AT] Austria .................................. 6082/80

[51] Int. Cl.³ .............................................. B07B 1/00
[52] U.S. Cl. .................................. 209/253; 23/313 R; 209/257; 209/942
[58] Field of Search .................................. 23/313, 314; 209/255–257, 253, 657, 703, 704, 942

[56] References Cited

U.S. PATENT DOCUMENTS

| 1,251,626 | 1/1918 | Bickley ............................ 209/704 |
| 2,035,845 | 3/1936 | Stanton ............................ 23/313 |
| 3,040,375 | 6/1962 | Rowen ............................ 23/313 P |
| 3,095,266 | 6/1963 | Lauder et al. ..................... 23/313 |
| 4,254,876 | 3/1981 | Flores-Verdugo et al. ......... 209/657 |
| 4,301,928 | 11/1981 | Coccia ............................ 209/657 |

FOREIGN PATENT DOCUMENTS

| 2305151 | 8/1974 | Fed. Rep. of Germany ........ 23/313 |
| 2417081 | 10/1974 | Fed. Rep. of Germany ........ 23/313 |
| 2838116 | 3/1979 | Fed. Rep. of Germany . |
| 134631 | 2/1952 | Finland ............................... 23/313 |
| 761553 | 11/1956 | United Kingdom ................ 209/655 |

Primary Examiner—Bernard Nozick
Attorney, Agent, or Firm—Brumbaugh, Graves, Donohue & Raymond

[57] ABSTRACT

In a discharge arrangement for green pellets a discharge chute and a conveying means arranged below the discharge chute are provided. In order to largely prevent the destruction of the green pellets, to keep the falling height of the green pellets as low as possible and to prevent conveying-belt transfers, a flap is provided between the discharge chute and a green-pellet collecting means. The flap is pivotable between two positions. In a first position it elongates the discharge chute to the green-pellet collecting means and in a second position it is directed transverse to the discharge chute towards a reconveying means.

10 Claims, 8 Drawing Figures

DISCHARGE ARRANGEMENT FOR REMOVING GREEN PELLETS OUT OF A PELLETIZING ARRANGEMENT

BACKGROUND OF THE INVENTION

The invention relates to a discharge arrangement for green pellets out of a pelletizing arrangement, in particular a pelletizing disk, comprising a discharge chute and a conveying means arranged below the discharge chute.

For pelletizing very finely grained raw materials, the material particles of the raw materials are wetted with a liquid and set in rolling motion in a pelletizing arrangement, such as a pelletizing drum or a pelletizing disk. By the influence of capillary adhesive forces, the material particles agglomerate into so-called green pellets in a spherical manner. The green pellets initially have a low strength and therefore have to be hardened in a further method step.

For producing the green pellets, pelletizing disks have proved particularly advantageous, since their investment costs are low as compared to those of pelletizing drums.

With the pelletizing disks used at present, the green pellets are conducted to a reversible conveying belt via a chute. In case of a good quality, the pellets are thrown onto a further conveying belt, which conveys the green pellets to the hardening station. With a bad quality, i.e. if there is no agglomeration of the material particles (for instance due to an improper adjustment of the inclination of the pelletizing disk or of the degree of humidity), the conveying direction of the reversible conveying belt is changed and the material particles coming from the pelletizing disk are dropped therefrom onto a conveying belt that conveys the material particles back to the processing plant.

The green pellets that are in order, according to the prior art, at first must fall from the chute of the pelletizing disk or of the pelletizing drum onto the reversible conveying belt and from there onto a further conveying belt, which involves the risk of the green pellets being destroyed because of their limited strength.

SUMMARY OF THE INVENTION

The invention, therefore, has as its object to provide a discharge arrangement for a pelletizing arrangement, by which the risk of destruction of the green pellets is largely prevented. The falling height of the green pellets is to be as low as possible and conveyor belt transfers are to be avoided.

This object is achieved according to the invention in that a flap that is pivotable between two positions is provided between the discharge chute and a collecting means for green pellets, in particular a collecting conveyor belt, which flap, in a first position, elongates the discharge chute to the green-pellet collecting means and, in a second position, is directed transverse to the discharge chute and towards a reconveying means.

Advantageously, the discharge chute comprises an opening that is closeable by the pivotable flap.

According to a preferred embodiment, which is particularly advantageous when several pelletizing disks are arranged adjacent to one another in a row, the reconveying means is arranged beside the green-pellet collecting means and parallel to the same, and the flap is pivotable about an axis extending parallel to these means.

According to a further preferred embodiment, which is provided particularly for pelletizing disks adjacently arranged in two rows, the reconveying means is arranged below the green-pellet collecting means and parallel to the same, the flap being pivotable about an axis that extends parallel to these means.

Therein, a further chute directed towards the reconveying means is suitably provided below the flap.

A preferred embodiment for pelletizing disks is characterized in that the flap extends only over a portion of the width of the discharge chute in the longitudinal direction of the green-pellet collecting means and the portion of the discharge chute following thereupon is blocked relative to the green-pellet collecting means by a rigidly arranged rebounding wall, the rebounding wall being directed towards the reconveying means in accordance with the second position of the flap.

Advantageously, a common collecting means for green pellets and a common reconveying means are allocated to the pelletizing disks in case of a discharge arrangement comprising a plurality of pelletizing disks.

According to a suitable embodiment, the pivotable flap, in its first position, elongates the discharge chute to a means for sieving or screening the green pellets, wherein the sieving or screening means advantageously comprise a roller bar grizzly.

BRIEF DESCRIPTION OF THE DRAWINGS

The invention will now be explained in more detail with reference to the accompanying drawings, wherein.

DESCRIPTION OF EXEMPLARY EMBODIMENTS

Figure 1:
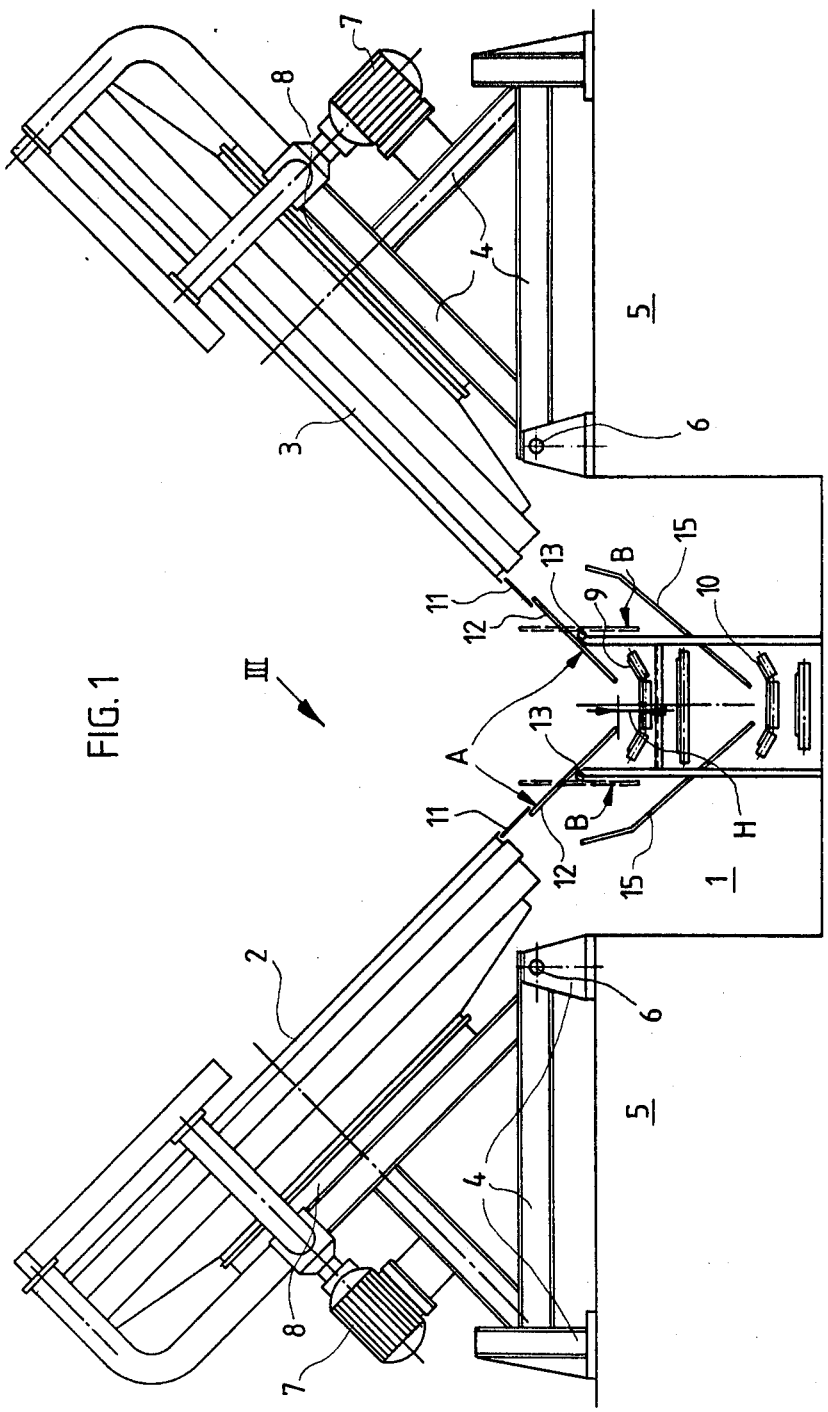
FIG. 1 is an embodiment for a double-row pelletizing arrangement in the side view.
Figure 2:
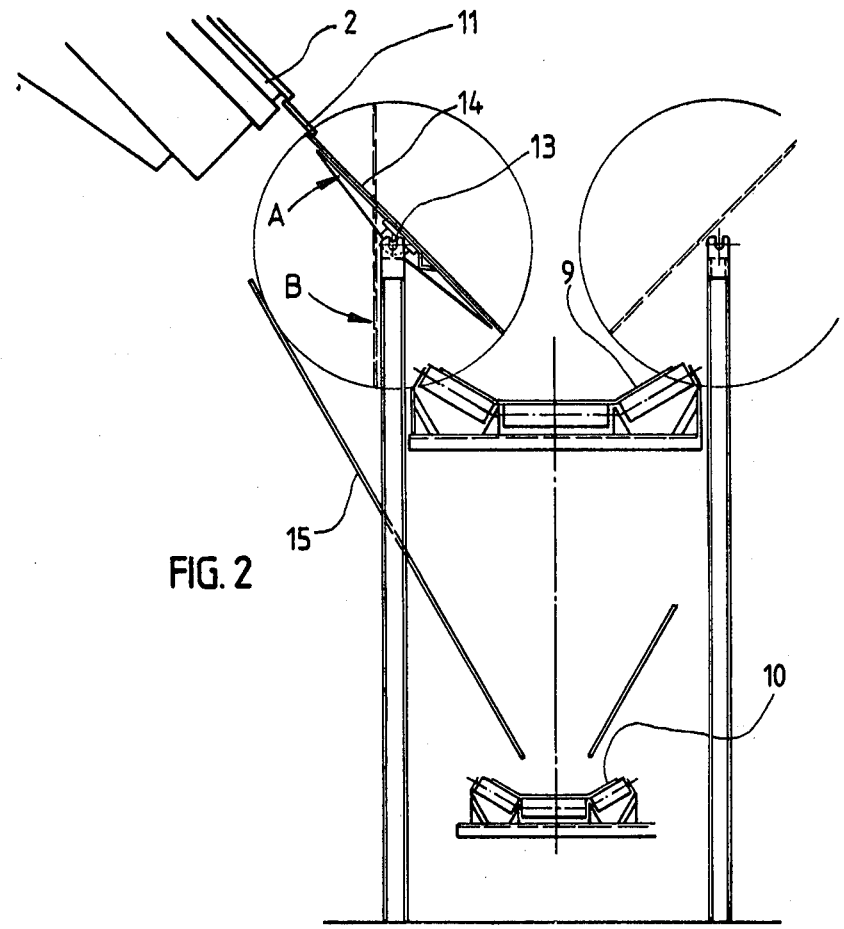
FIG. 2 is a detail of FIG. 1 on an enlarged scale.
Figure 3:
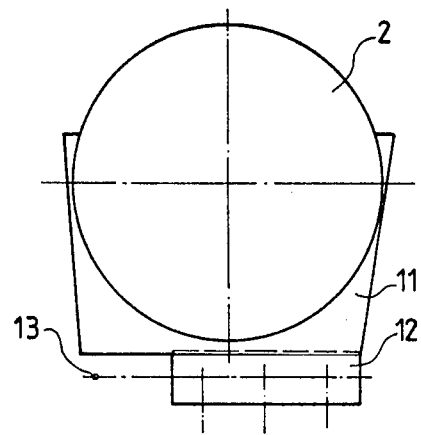
FIG. 3 is a view in the direction of the arrow III of FIG. 1.

According to FIG. 1 pelletizing disks 2, 3 are arranged on both sides of a base pit 1. Each of the pelletizing disks is mounted on the base 5 by means of a supporting structure 4. The inclination of the pelletizing disks may be changed in accordance with the requirements of the material by pivoting the disks about an axis 6 of the supporting structure. A driving motor 7 serves for setting the pelletizing disk in rotation via a gear 8.

In the base pit 1 two conveying belts 9, 10 are arranged one above the other between the pelletizing disks 2, 3. The upper conveying belt 9 serves as green-pellet collecting belt, the lower conveying belt 10 serves as reconveying belt for the raw material in case no pellets at all or pellets of a poor quality have formed. This is, for instance, frequently the case at the onset of pelletizing until the correct adjustment of the pelletizing disk, i.e., its inclination and number of revolutions, and the right degree of humidity of the material particles of the raw material, have been found. The ready green pellets reach a pivotable flap 12 via a discharge chute 11, whose inclination corresponds to that of the disk. The flap is pivotable about an axis 13, which is directed parallel to the conveying direction, and longitudinal extension, of the conveying belts 9 and 10. It may be pivoted between two positions, i.e. from a first position A, in which the flap elongates the discharge chute by its sliding surface 14 to the upper green-pellet collecting belt 9, into a second position B, which is illustrated in broken lines in FIG. 1 and in which the flap 12 blocks the path between the discharge chute 11 and the green-pellet collecting belt 9. The stock coming from the pelletizing disk in this case falls onto the flap 12, is deflected by the latter, and is conducted to the lower reconveying belt 10 via a further chute 15 directed thereto.

Figure 4:
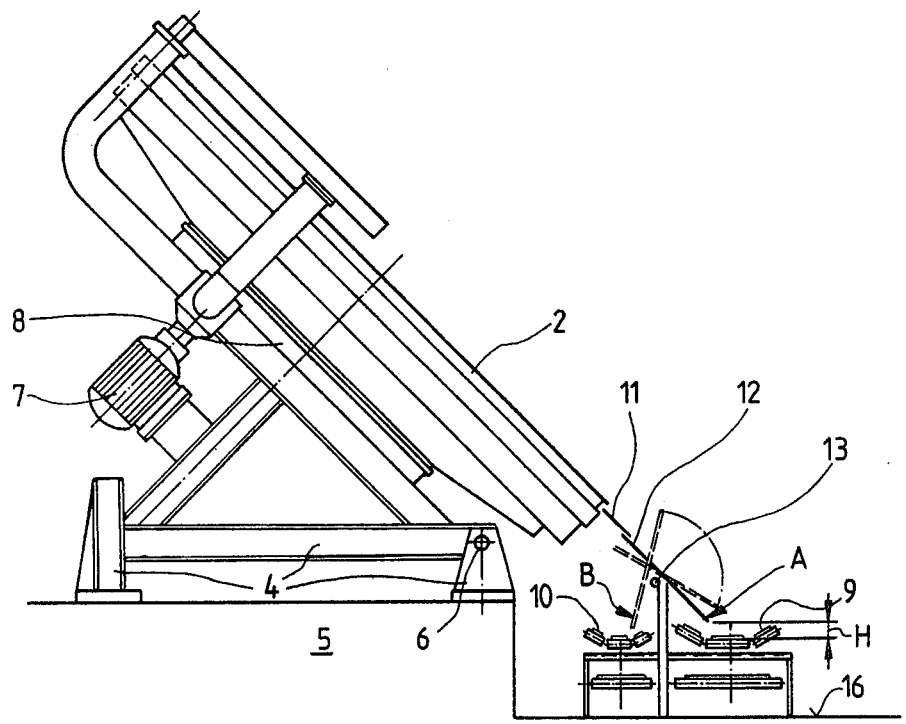
FIG. 4 represents an embodiment for a single-row pelletizing arrangement in an illustration analogous to FIG. 1.

According to the embodiment illustrated in FIG. 4, the two conveying belts 9, 10 are arranged on a base step 16 below the pelletizing disk 2, but are located adjacent each other. The flap 12 is pivotable between two positions A and B in a manner similar to the embodiment described above. In one position it elongates the discharge chute 11 to the green-pellet collecting belt 9 with its sliding surface 14, in the other position B it blocks the path to the green-pellet collecting belt 9 and is directed straight to the reconveying belt 10.

As can be seen from the Figures, the falling height H of the green pellets is very low. Falling occurs only from the flap 12 onto the green-pellet collecting belt 9. From this collecting belt, the green pellets are conducted further to a hardening station.

Figure 5:
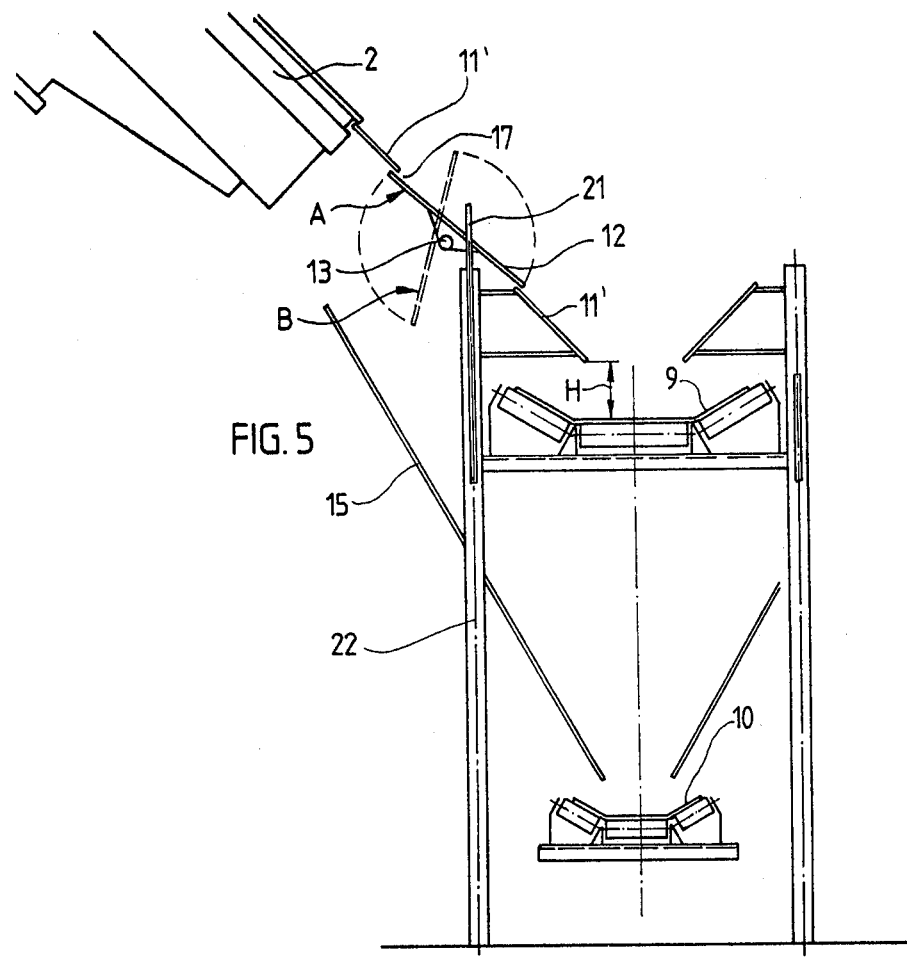
FIGS. 5 and 6 are illustrations analogous to FIGS. 2 and 3, of a further embodiment.
Figure 6:
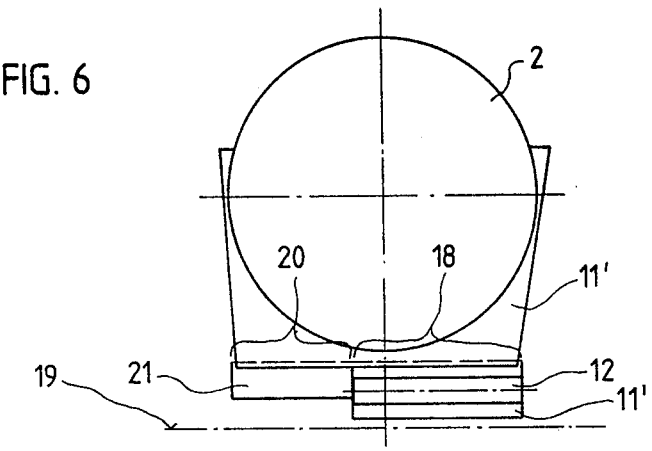

According to the embodiment illustrated in FIGS. 5 and 6, the discharge chute 11, comprises an opening 17, which is covered by the flap 12 in a position A and is partially released in a second position B. The flap thus may be regarded as part of the discharge chute. Thereby it is possible to design the flap smaller, yet observing a low falling height H only. As can be seen particularly from FIG. 6, the flap 12 and the chute section 11' extend only over a portion 18 of the discharge chute 11 in the longitudinal direction 19 of the green-pellet collecting means 9. A rebounding wall 21 extends over the remaining portion 20 of the discharge chute, which wall, as can be seen from FIG. 5, is rigidly mounted to the stand 22 of the green-pellet collecting means 9 in the vertical direction. This rebounding wall extends to the reconveying means 10 provided below the green-pellet collecting means, via a further chute 15. Thereby it is reached that green pellets that have become too large, which are discharged preferably at the beginning of the discharge chute 11', i.e., that portion 20 of the discharge chute 11' which is covered by the rebounding wall 21 relative to the green-pellet collecting means 9, will not be seized by the green-pellet collecting means, but are reconveyed by the reconveying means 10.

Figure 7:
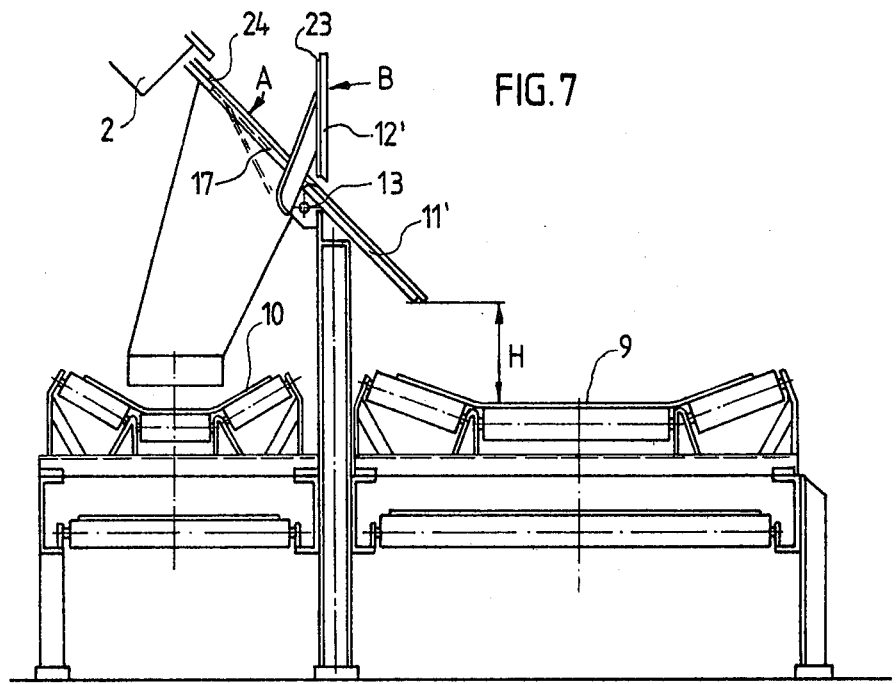
FIG. 7 represents a variant in an illustration analogous to FIG. 4.

According to FIG. 7 the pivot axis 13 of the flap 12', which is designed to be asymmetrical in respect of this pivot axis, is arranged in the vicinity of the lower end of the opening 17. The flap 12' has an edge groove 23 which snaps in a corresponding counter groove 24 of the discharge chute 11' as soon as the opening 17 has been closed by the flap.

Figure 8:
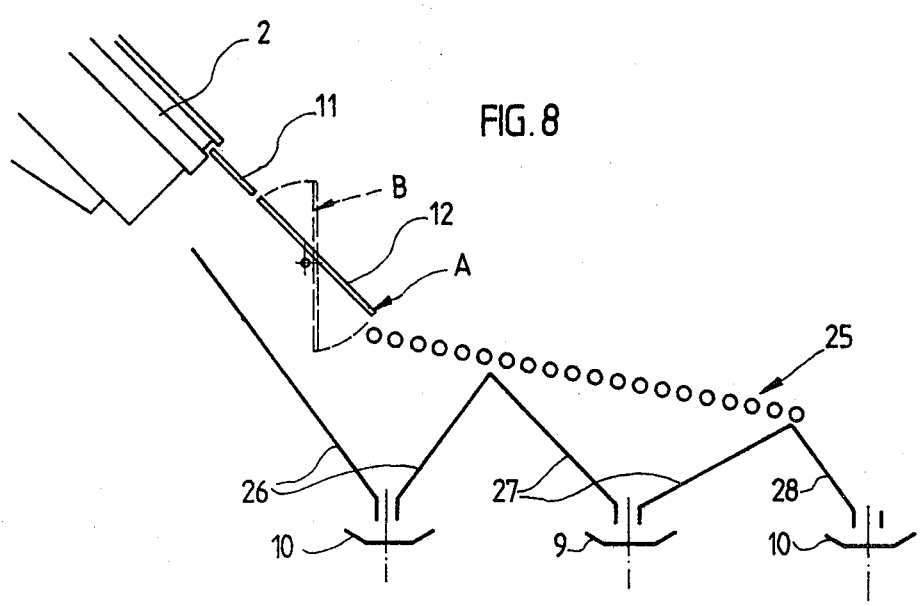
FIG. 8 shows a side view of a discharge arrangement including a sieving or screening means.

With the variant illustrated in FIG. 8, the green-pellet collecting means is designed as an arrangement sieving or screening the green pellets, i.e., as a roller bar grizzly 25. Below the roller bar grizzly there are further, hopper-shaped chutes 26, 27, 28 conducting the green pellets to conveying belts 9, 10. The conveying belts denoted by 10 are designed as reconveying means onto which the green pellets that are too small or too large fall.

If a single green-pellet collecting means is provided for a plurality of pelletizing disks, the arrangement of the pivotable flap is a possible means of controlling the charging of the green-pellet collecting means, i.e., it is possible to prevent overchargings of the green-pellet collecting belt at certain points by charging it uniformly.

What I claim is:

1. In a discharge arrangement for removing green pellets out of a pelletizing disk or drum, including a discharge chute and a conveying means arranged below said discharge chute, the improvement comprising a green-pellet conveying means, a reconveying means, and a flap arranged between said discharge chute and said green-pellet conveying means, said flap being pivotable between a first position in which said flap elongates said discharge chute toward said green-pellet conveying means and a second position in which said flap is directed transverse to said discharge chute towards said reconveying means to reconvey defective pellets.

2. A discharge arrangement as set forth in claim 1, wherein said discharge chute comprises an opening that is closeable by said flap.

3. A discharge arrangement as set forth in claim 1, wherein said reconveying means is arranged beside said green-pellet conveying means and parallel thereto, and said flap is pivotable about an axis extending parallel to said reconveying means and said green-pellet conveying means.

4. A discharge arrangement as set forth in claim 1, wherein said green-pellet conveying means is a collecting conveying belt.

5. A discharge arrangement as set forth in claim 2, wherein said reconveying means is arranged below said green-pellet conveying means and parallel thereto, and said flap is pivotable about an axis extending parallel to said reconveying and green-pellet conveying means.

6. A discharge arrangement as set forth in claim 5, further comprising a further chute arranged below said flap and directed to said reconveying means.

7. A discharge arrangement as set forth in claim 1, further comprising a screening means for screening said green pellets, and wherein said flap, in its first position, elongates said discharge chute to said screening means.

8. A discharge arrangement as set forth in claim 7, wherein said screening means comprises a roller bar grizzly.

9. In a discharge arrangement for removing green pellets out of a pelletizing arrangement including a plurality of pelletizing disks, a discharge chute and a conveying means arranged below said discharge chute, the improvement comprising a common green-pellet conveying means and a common reconveying means allocated to said plurality of pelletizing disks, and a flap arranged between said discharge chute and said common green-pellet conveying means, said flap being pivotable between a first position and a second position and, in said first position, elongating said discharge chute to said common green-pellet conveying means and, in said second position, being directed transverse to said discharge chute towards said common reconveying means.

10. In a discharge arrangement for removing green-pellets out of a pelletizing arrangement including pelletizing disks, comprising a discharge chute, and a conveying means arranged below said discharge chute, the improvement comprising a green-pellet collecting means, a reconveying means, and a pivotable flap arranged between said discharge chute and said green-pellet collecting means and pivotable between a first position in which said pivotable flap elongates said discharge chute to said green-pellet collecting means, and a second position transverse to said discharge chute and directed toward said reconveying means, wherein the width of said discharge chute comprises a first portion and an adjacent second portion, said pivotable flap being arranged to extend only over said first portion when said pivotable flap is in said first position, and wherein a rebounding wall is fixed between said discharge chute and said green-pellet collecting means, said rebounding wall blocking said second portion of said discharge chute and being directed toward said reconveying means in a plane approximately parallel to said pivotable flap when said pivotable flap is in said second position.

* * * * *

UNITED STATES PATENT AND TRADEMARK OFFICE
CERTIFICATE OF CORRECTION

PATENT NO. : 4,428,831
DATED : Jan. 31, 1984
INVENTOR(S) : Rainer Dreier

It is certified that error appears in the above—identified patent and that said Letters Patent is hereby corrected as shown below:

Col. 3, line 31, after "11," insert --11'--.

Col. 4, line 36, "claim 2" should read --claim 4--.

Signed and Sealed this

Eighth Day of May 1984

[SEAL]

Attest:

GERALD J. MOSSINGHOFF

Attesting Officer

Commissioner of Patents and Trademarks